United States Patent
Nakamura et al.

(10) Patent No.: US 10,773,613 B2
(45) Date of Patent: Sep. 15, 2020

(54) VEHICLE SEAT

(71) Applicant: NHK SPRING CO., LTD., Yokohama-shi, Kanagawa (JP)

(72) Inventors: Takeshi Nakamura, Yokohama (JP); Kenichi Katsube, Yokohama (JP); Shu Kondou, Yokohama (JP); Daisuke Tanaka, Yokohama (JP)

(73) Assignee: NHK SPRING Co., Ltd., Yokohama-shi, Kanagawa (JP)

( * ) Notice: Subject to any disclaimer, the term of this patent is extended or adjusted under 35 U.S.C. 154(b) by 5 days.

(21) Appl. No.: 16/374,401

(22) Filed: Apr. 3, 2019

(65) Prior Publication Data
US 2019/0308527 A1 Oct. 10, 2019

(30) Foreign Application Priority Data
Apr. 10, 2018 (JP) ................................. 2018-075661

(51) Int. Cl.
| | |
|---|---|
| *B60N 2/427* | (2006.01) |
| *B60N 2/16* | (2006.01) |
| *B60N 2/10* | (2006.01) |
| *B60N 2/75* | (2018.01) |
| *B60N 2/20* | (2006.01) |

(52) U.S. Cl.
CPC ............ *B60N 2/1615* (2013.01); *B60N 2/10* (2013.01); *B60N 2/20* (2013.01); *B60N 2/767* (2018.02)

(58) Field of Classification Search
CPC . B60N 2/22; B60N 2/20; B60N 2/682; B60N 2/06; B60N 2/3065; B60N 2/68; B60N 2/12; B60N 2/0232
See application file for complete search history.

(56) References Cited

U.S. PATENT DOCUMENTS

| | | | | |
|---|---|---|---|---|
| 8,177,280 B2* | 5/2012 | Yamada | ................. | B60N 2/161 |
| | | | | 296/65.05 |
| 8,616,645 B2* | 12/2013 | Ito | ......................... | B60N 2/165 |
| | | | | 297/344.17 |
| 9,637,033 B2* | 5/2017 | Fujita | ................... | B60N 2/1615 |
| 2007/0194613 A1* | 8/2007 | Kojima | ............... | B60N 2/0705 |
| | | | | 297/344.15 |
| 2016/0176325 A1* | 6/2016 | Fujita | ...................... | B60N 2/06 |
| | | | | 297/216.17 |

FOREIGN PATENT DOCUMENTS

| | | |
|---|---|---|
| JP | H10166919 A | 6/1998 |
| JP | 2017-019441 A | 1/2017 |

\* cited by examiner

*Primary Examiner* — Shin H Kim
(74) *Attorney, Agent, or Firm* — Knobbe, Martens, Olson & Bear, LLP

(57) ABSTRACT

In a vehicle seat, a second parallel link mechanism is actuated in order to adjust an vertical position of a seat body with respect to a vehicle body, such that a first parallel link mechanism is moved up or down together with the seat body with respect to the vehicle body. In order to recline a seatback as an integral unit with a seat cushion, the first parallel link mechanism and the second parallel link mechanism are actuated such that an upper link is maintained in a predetermined orientation. The upper link is restricted from rotating relative to the armrest, and so the armrest is also maintained in a predetermined orientation.

7 Claims, 13 Drawing Sheets

VEHICLE SEAT

CROSS-REFERENCE TO RELATED APPLICATION

This application is based on and claims priority under 35 USC 119 from Japanese Patent Application No. 2018-075661 filed on Apr. 10, 2018, the disclosure of which is incorporated by reference herein.

BACKGROUND

Technical Field

The present disclosure relates to a vehicle seat including an armrest.

Related Art

An armrest support structure disclosed in Japanese Patent Application Laid-Open (JP-A) No. H10-166919 includes a tilting link with one end pivotably supported on a vehicle body side, a following link with one end pivotably supported at another end of the tilting link so as to be capable of turning, and an armrest shaft that rotatably supports one end of an armrest and that axially supports another end of the following link. A stopper that uses the following link to restrict rotation of the armrest is attached to the armrest. The armrest thereby maintains its own (a predetermined) orientation, irrespective of tilting (reclining) of the seatback.

In a vehicle seat disclosed in JP-A No. 2017-19441, a seatback is fixed to a rear end portion of a seat cushion so as to be incapable of reclining. The seat cushion is attached to a vehicle body via a front side coupling mechanism and a rear side coupling mechanism. The front side coupling mechanism and the rear side coupling mechanism move a front link and a rear link toward the vehicle front side in circular arcs, each centered on an imaginary center point set at a vehicle upper side of the seat cushion, so as to tip the seat cushion rearward and downward. The seatback is thereby reclined as an integral unit with the seat cushion, thus suppressing the back of a seated occupant from shifting (suppressing the position of the back of the seated occupant from shifting relative to the seatback).

The armrest support structure disclosed in JP-A No. H10-166919 cannot be applied to a vehicle seat in which a seatback reclines as an integral unit with a seat cushion, such as the vehicle seat disclosed in JP-A No. 2017-19441, nor to a vehicle seat in which vertical positions of a seat cushion and a seatback are adjustable with respect to a vehicle body.

SUMMARY

In consideration of the above circumstances, an object of the present disclosure is to obtain a vehicle seat in which an armrest can be maintained in a predetermined orientation irrespective of reclining, in a configuration in which vertical positions of a seat cushion and a seatback are adjustable with respect to a vehicle body, and in which the seatback reclines as an integral unit with the seat cushion.

A vehicle seat of a first aspect of the present disclosure includes a seat body, a lifter mechanism, a reclining mechanism, an armrest, an upper link, a lower link, a first tilting link, and a second tilting link. The seat body includes a seat cushion and a seatback. The lifter mechanism is configured including a rear link rotatably coupled to a rear portion of the seat cushion via a first shaft and rotatably coupled to a support member on a vehicle body side via a second shaft, and is capable of adjusting a vertical position of the seat body with respect to the vehicle body. The reclining mechanism reclines the seatback, as an integral unit with the seat cushion, with respect to a fixed point at the second shaft. The armrest is rotatably coupled to a side face of the seatback via a third shaft. The upper link has a front end side rotatably coupled to the third shaft, and is restricted from rotating relative to the armrest. The lower link has a front end side rotatably coupled to the first shaft. The first tilting link has an upper end side rotatably coupled to a rear end side of the upper link via a fourth shaft, has a lower end side rotatably coupled to a rear end side of the lower link via a fifth shaft, and configures a first parallel link mechanism together with a part of the seat body, the upper link, and the lower link. The second tilting link has an upper end side rotatably coupled to the fifth shaft, has a lower end side rotatably coupled to the support member via a sixth shaft, and configures a second parallel link mechanism together with the rear link, the lower link, and the support member.

In the vehicle seat of the first aspect, the seat body includes the seat cushion and the seatback. The lifter mechanism is configured including the rear link rotatably coupled to the rear portion of the seat cushion via the first shaft and rotatably coupled to the support member on the vehicle body side via the second shaft, and is capable of adjusting an vertical position of the seat body with respect to the vehicle body. The reclining mechanism reclines the seatback as an integral unit with the seat cushion with respect to a fixed point at the second shaft. The armrest is rotatably coupled to a side face of the seatback via the third shaft.

Note that this vehicle seat further includes the upper link that has a front end side rotatably coupled to the third shaft, and that is restricted from rotating relative to the armrest, and the lower link that has a front end side rotatably coupled to the first shaft. The vehicle seat also includes the first tilting link that has an upper end side rotatably coupled to the rear end side of the upper link via the fourth shaft and a lower end side rotatably coupled to the rear end side of the lower link via the fifth shaft, and the second tilting link that has an upper end side rotatably coupled to the fifth shaft and a lower end side rotatably coupled to the support member on the vehicle body side via the sixth shaft. The first tilting link configures the first parallel link mechanism together with part of the seat body, the upper link, and the lower link. The second tilting link configures the second parallel link mechanism together with the rear link, the lower link, and the support member on the vehicle body side.

In the vehicle seat configured as described above, in order to adjust an vertical position of the seat body (the seat cushion and the seatback) with respect to the vehicle body, the second parallel link mechanism is actuated such that the first parallel link mechanism is moved up or down together with the seat body with respect to the vehicle body. In order to recline the seatback as an integral unit with the seat cushion, at least the first parallel link mechanism out of the first parallel link mechanism and the second parallel link mechanism is actuated such that the upper link is maintained in a predetermined orientation. The upper link is restricted from rotating relative to the armrest, and so the armrest is also maintained in a predetermined (for example, substantially horizontal) orientation.

In this manner, in the present exemplary disclosure the armrest can be maintained in a predetermined orientation irrespective of reclining in a configuration in which the vertical positions of the seat cushion and the seatback are adjustable with respect to the vehicle body, and the seatback reclines as an integral unit with the seat cushion.

A vehicle seat of a second aspect of the present disclosure is the vehicle seat of the first aspect, wherein the upper link and the lower link are disposed offset from each other in a seat left-right direction. Moreover, the first tilting link includes an upper portion coupled to the upper link, a lower portion coupled to the lower link, and a coupling portion linking the upper portion and the lower portion together in the seat left-right direction.

In the vehicle seat of the second aspect, the upper link positioned on the armrest side and the lower link positioned on the lifter mechanism (rear link) side are disposed offset from each other in the seat left-right direction. Moreover, the first tilting link includes the upper portion coupled to the upper link, the lower portion coupled to the lower link, and the coupling portion that links the upper portion and the lower portion together in the seat left-right direction. This makes it easier for the first tilting link to span between the upper link and the lower link that are positioned offset from each other in the seat left-right direction.

A vehicle seat of a third aspect of the present disclosure is the vehicle seat of the first aspect, wherein a seat vertical direction intermediate portion of the first tilting link is bent so as to protrude toward a seat rear side.

In the vehicle seat of the third aspect, the first tilting link that couples together the upper link positioned on the armrest side and the lower link positioned on the lifter mechanism (rear link) side is bent at a seat vertical direction intermediate portion so as to protrude toward the seat rear side. For example, this enables the first tilting link to be disposed at the seat rear side of any components provided to a side portion of the seatback, thereby enabling the overall configuration of the vehicle seat to be made smaller in the seat left-right direction than in cases in which the first tilting link is disposed at the seat left-right direction outside of such components.

A vehicle seat of a fourth aspect of the present disclosure is the vehicle seat of the first aspect, wherein the armrest, the rear link, the upper link, the lower link, the first tilting link, and the second tilting link are respectively provided on both left-right direction sides of the seat body. Moreover, the left and right rear links are coupled together by the first shaft, the left and right first tilting links are coupled together by a coupling member, and the left and right lower links and the left and right second tilting links are coupled together by the fifth shaft.

In the vehicle seat of the fourth aspect, the armrests, the rear links, the upper links, the lower links, the first tilting links, and the second tilting links are provided on both left-right direction sides of the seat body. The first parallel link mechanisms and the second parallel link mechanisms are thereby provided on both left-right direction sides of the seat body. The left and right rear links are coupled together by the first shaft, the left and right first tilting links are coupled together by the coupling member, and the left and right lower links and the left and right second tilting links are coupled together by the fifth shaft. This enables the left and right first parallel link mechanisms, the left and right second parallel link mechanisms, and the left and right armrests to be coordinated with each other.

As described above, the vehicle seat according to the present disclosure exhibits the excellent advantageous effect of enabling an armrest to be maintained in a predetermined orientation irrespective of reclining, in a configuration in which the seat cushion and the seatback are moved up and down with respect to the vehicle body, and in which the seatback reclines as an integral unit with the seat cushion.

BRIEF DESCRIPTION OF THE DRAWINGS

Exemplary embodiments of the present disclosure will be described in detail based on the following figures, wherein.

DETAILED DESCRIPTION

Figure 1:
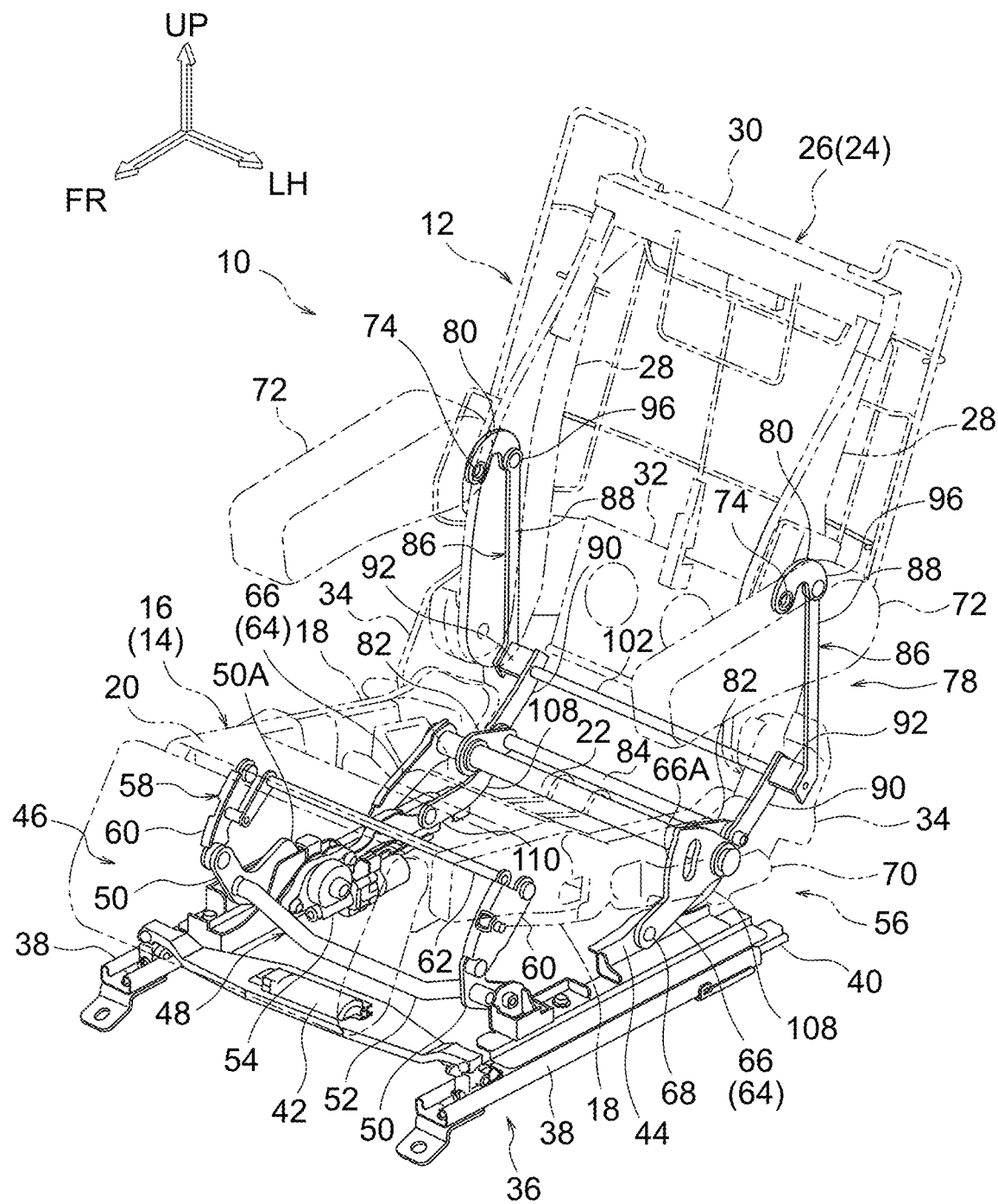
FIG. 1 is a perspective view illustrating configuration of relevant portions of a vehicle seat according to an exemplary embodiment of the present disclosure.
Figure 2:
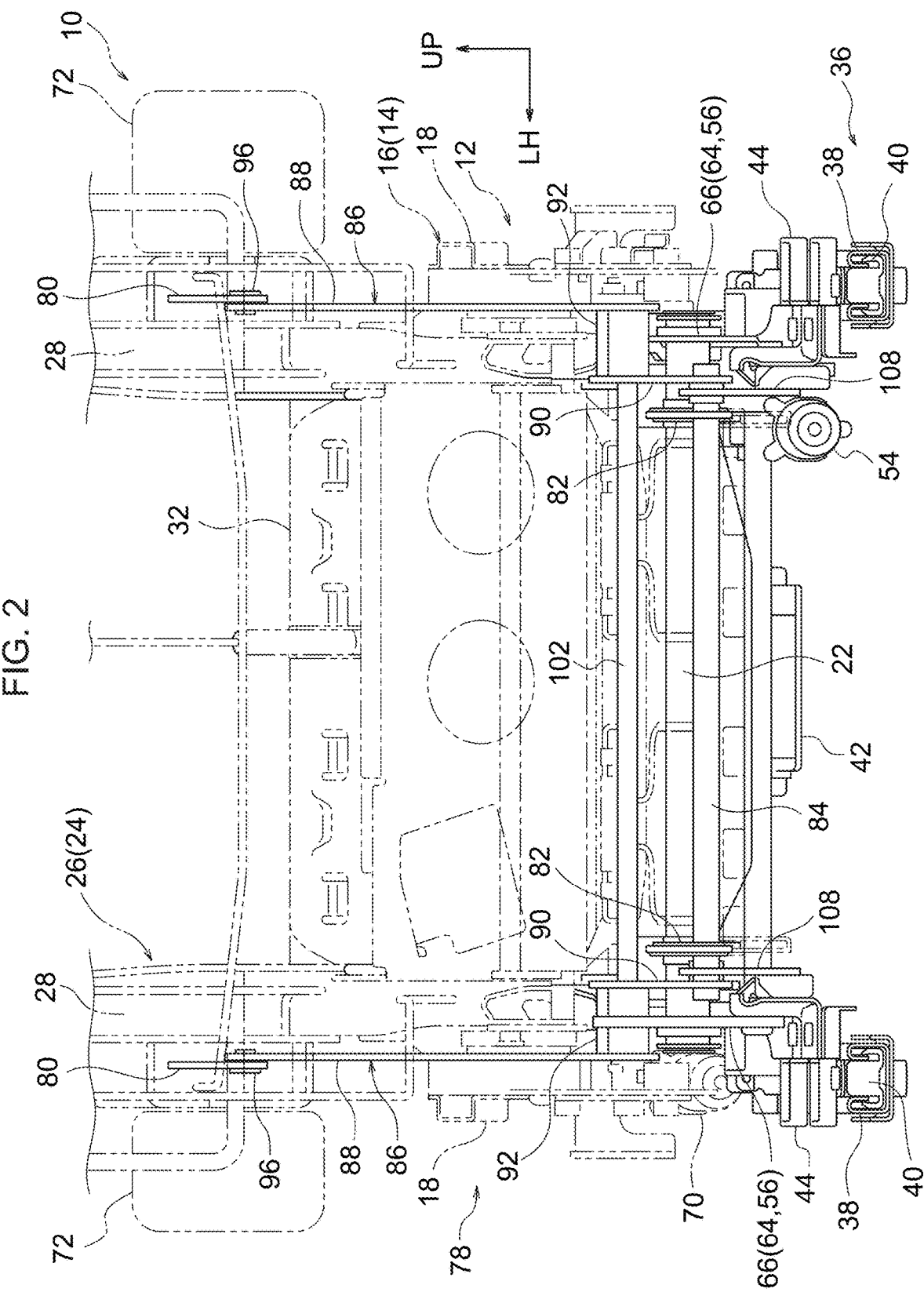
FIG. 2 is a back view of part of the vehicle seat as viewed from the seat rear side.
Figure 3:
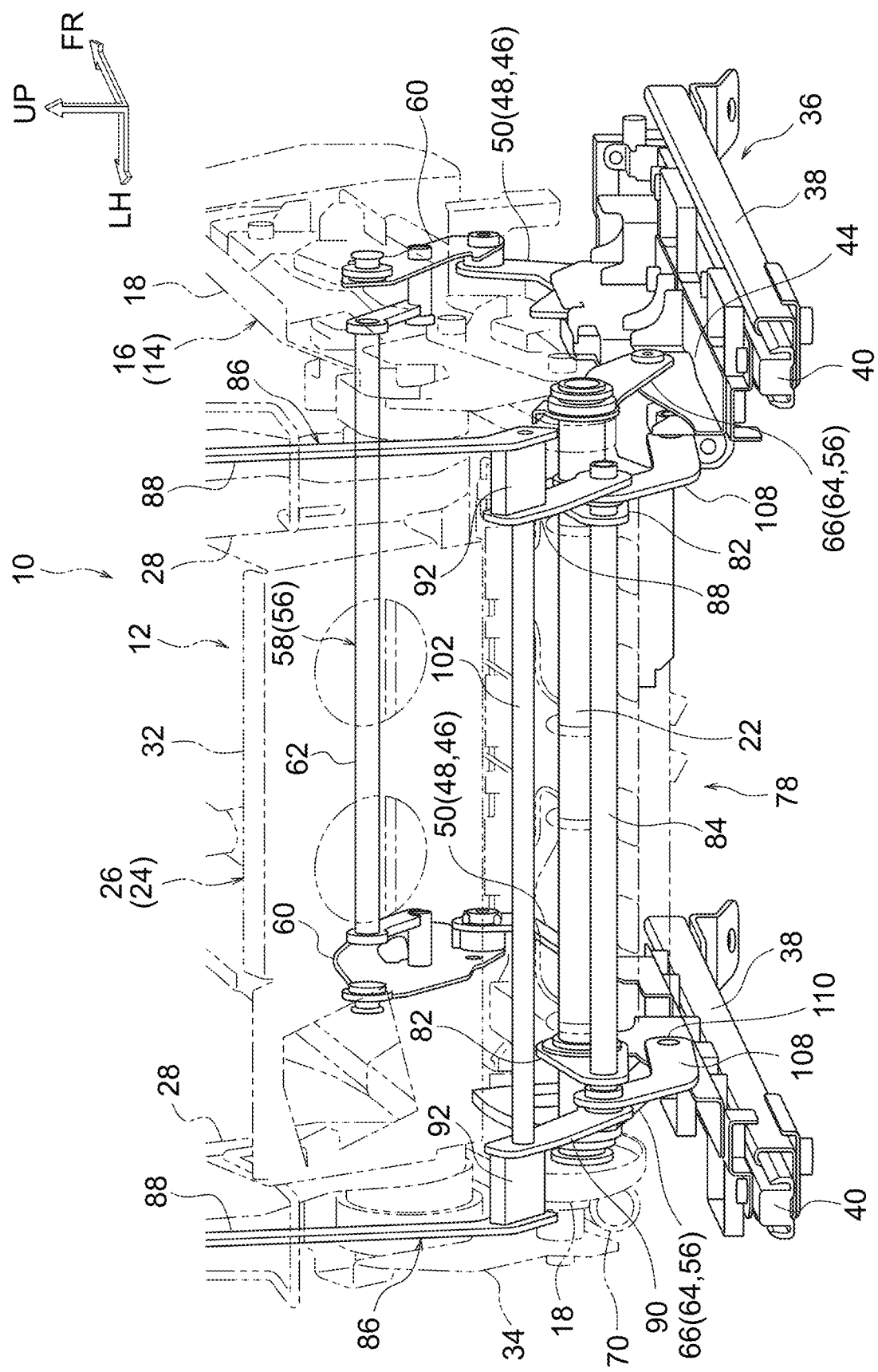
FIG. 3 is a perspective view of part of the vehicle seat as viewed obliquely from the seat rear-right side.
Figure 4:
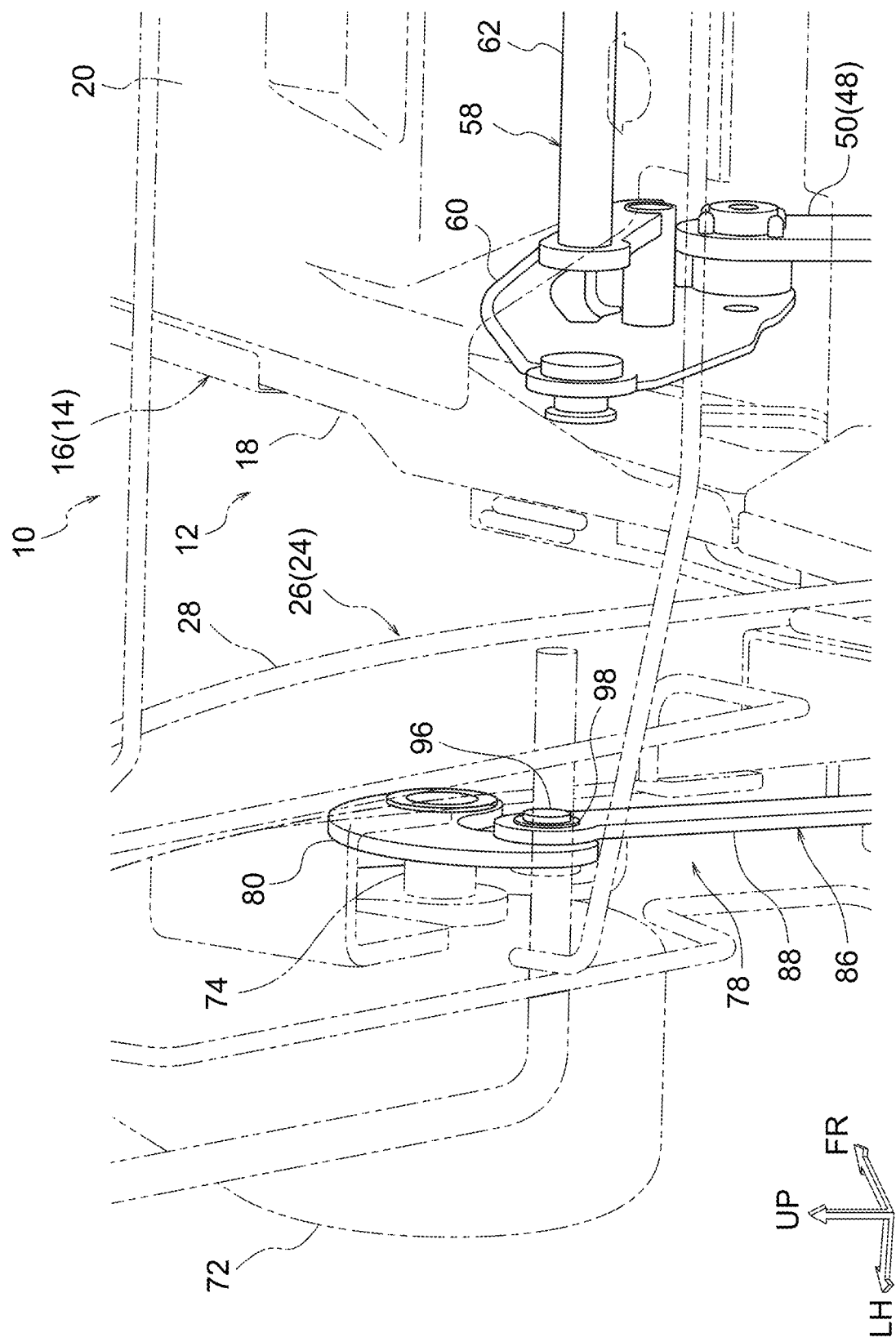
FIG. 4 is a perspective view of part of the vehicle seat as viewed obliquely from the seat rear-right upper side.
Figure 5:
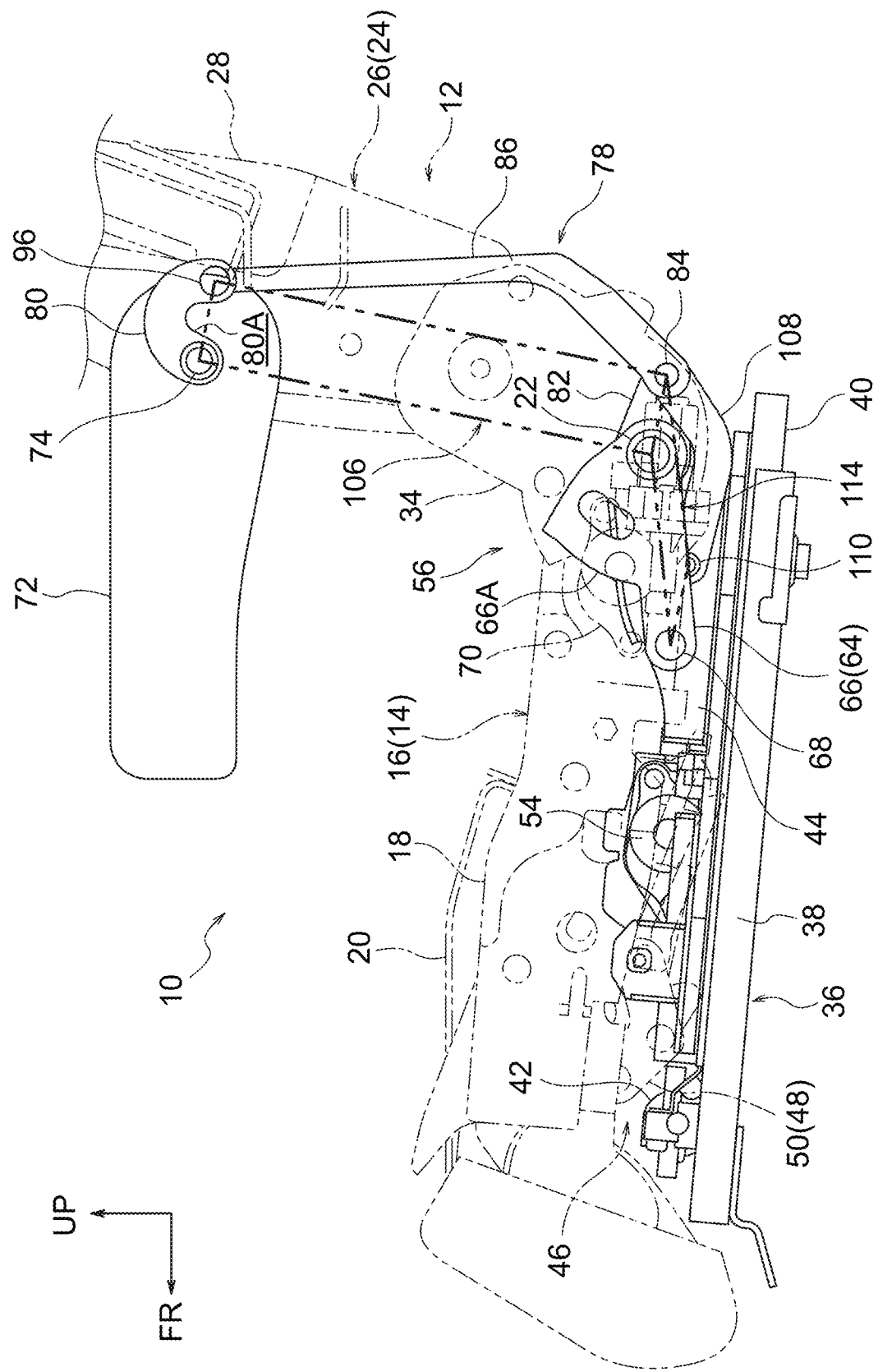
FIG. 5 is a side view of part of the vehicle seat, illustrating a state of a seat body prior to reclining.
Figure 6:
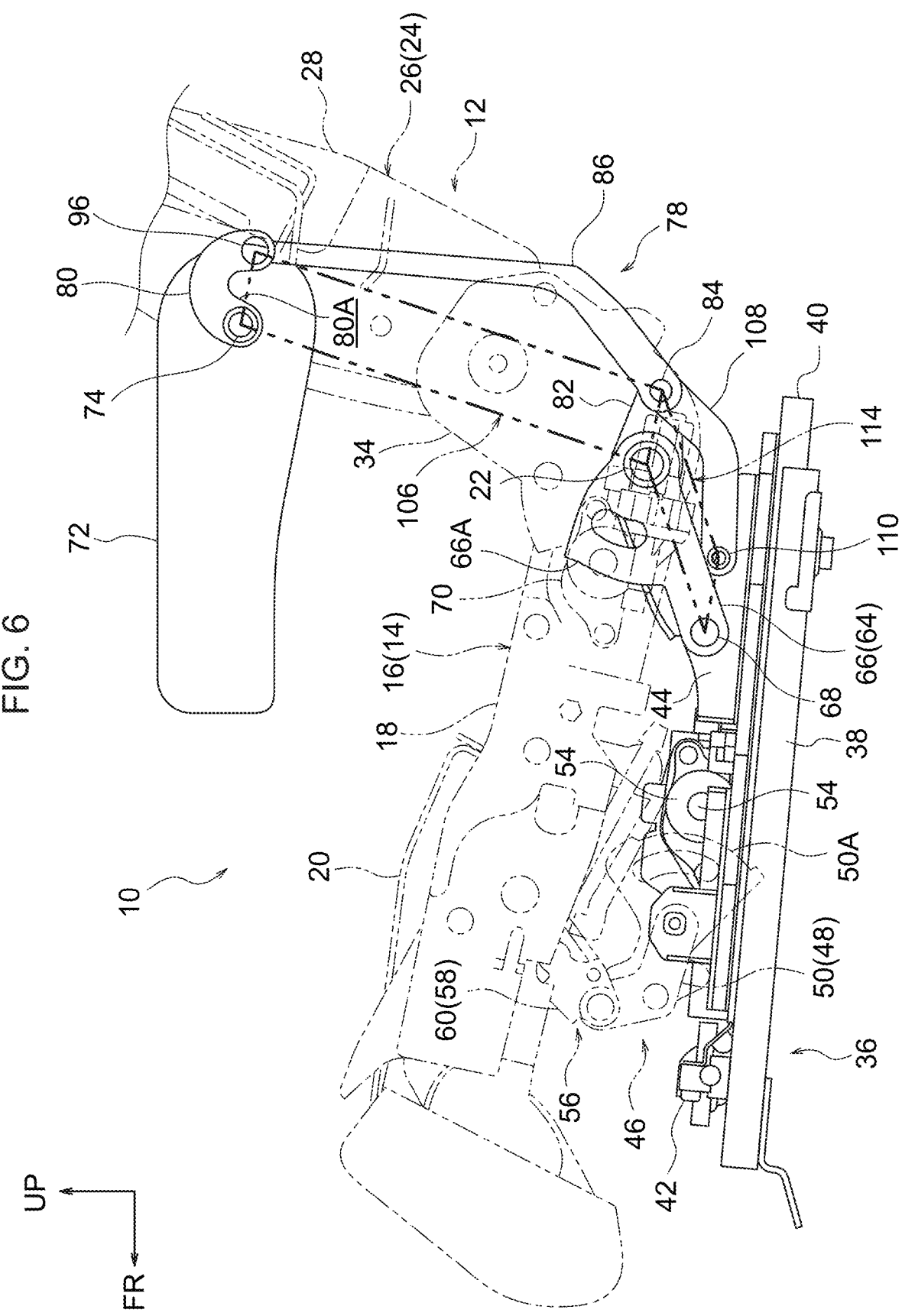
FIG. 6 is a side view corresponding to FIG. 5, illustrating a state in which a seat body is partway through reclining.
Figure 7:
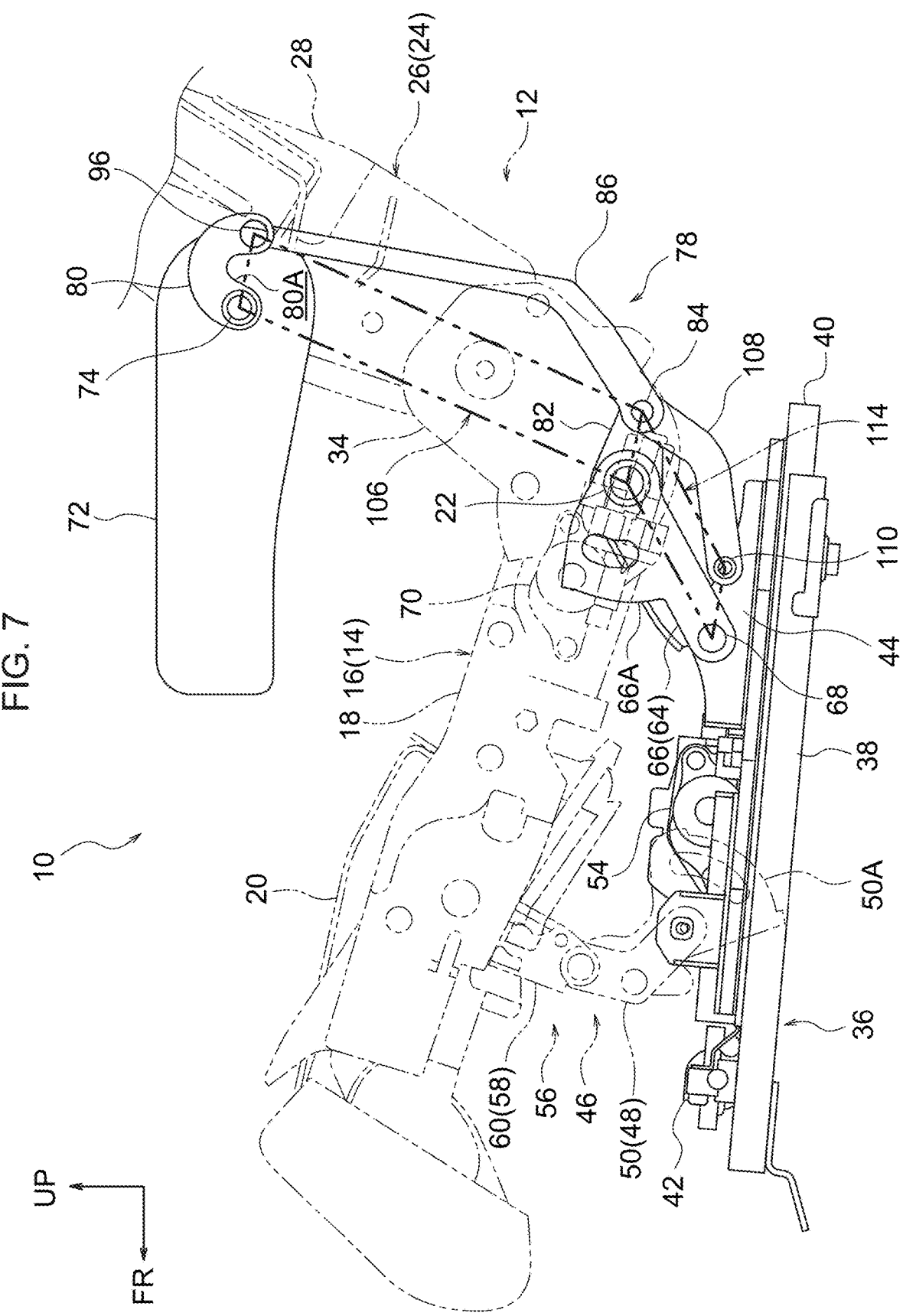
FIG. 7 is a side view corresponding to FIG. 5 and FIG. 6, illustrating a state of a seat body when fully reclined.
Figure 8:
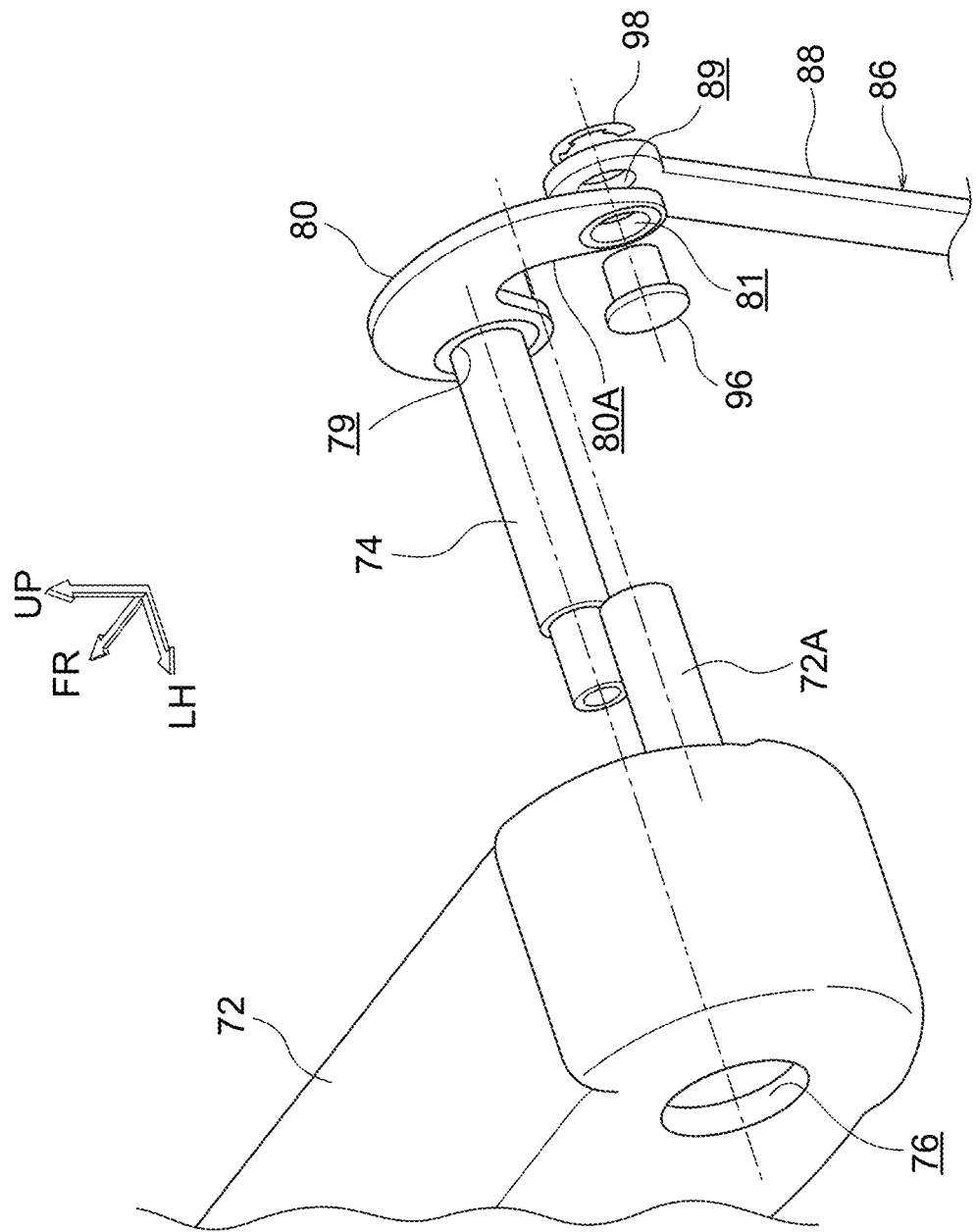
FIG. 8 is an exploded perspective view illustrating configuration peripheral to an armrest on the left side of the vehicle seat.
Figure 9:
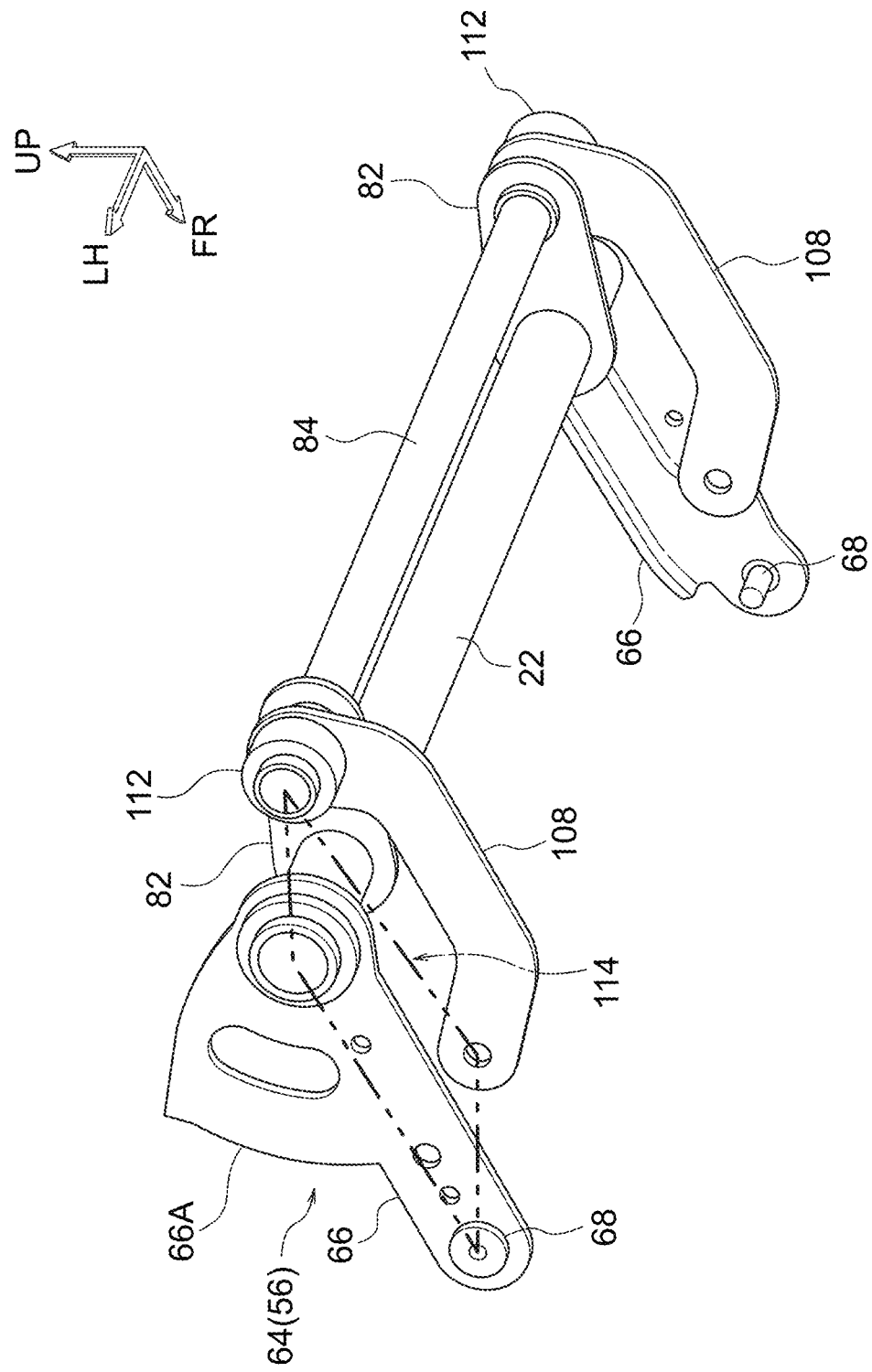
FIG. 9 is a perspective view illustrating partial configuration of a second parallel link mechanism.
Figure 10:
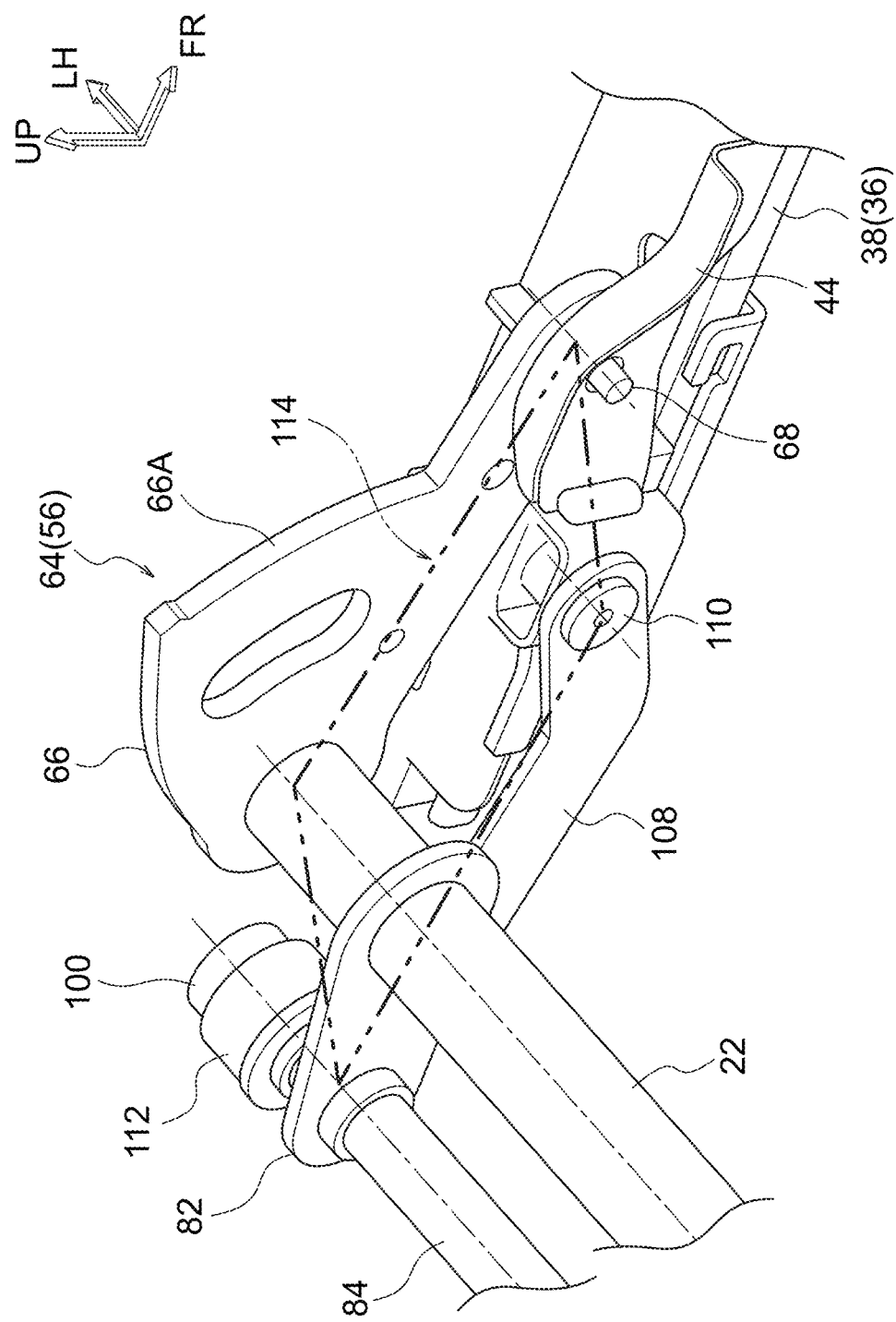
FIG. 10 is a perspective view illustrating partial configuration of a second parallel link mechanism.
Figure 11:
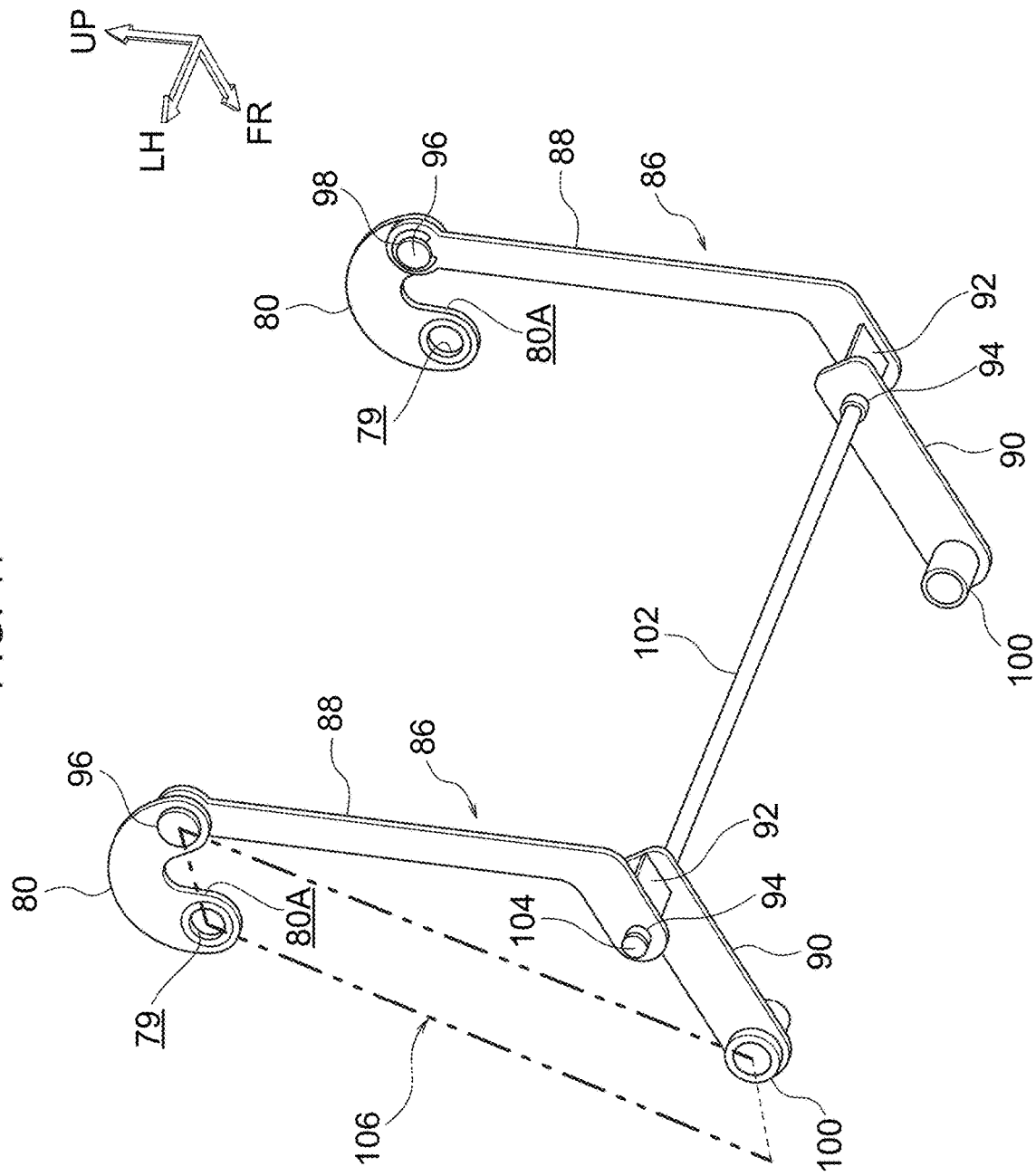
FIG. 11 is a perspective view illustrating partial configuration of a first parallel link mechanism.
Figure 12:
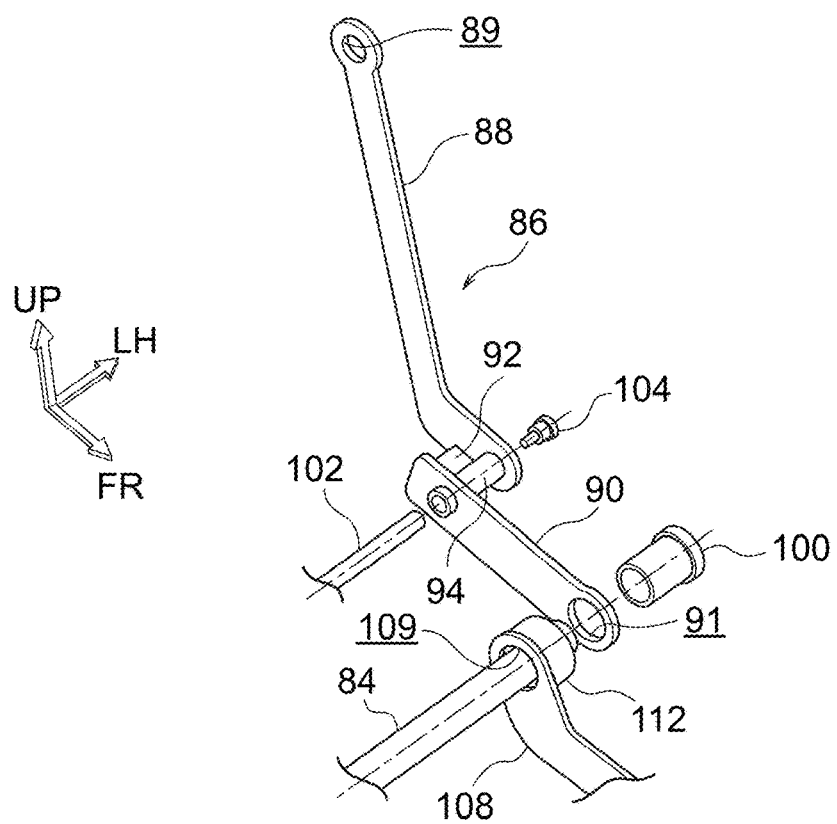
FIG. 12 is an exploded perspective view illustrating part of the configuration illustrated in FIG. 11 and configuration peripheral thereto.
Figure 13:
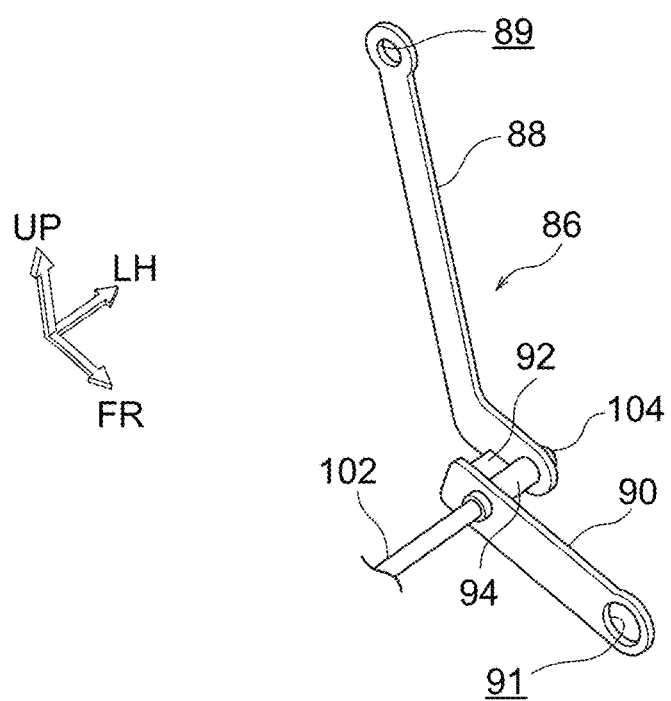
FIG. 13 is a perspective view illustrating part of the configuration illustrated in FIG. 11.
Figure 14:
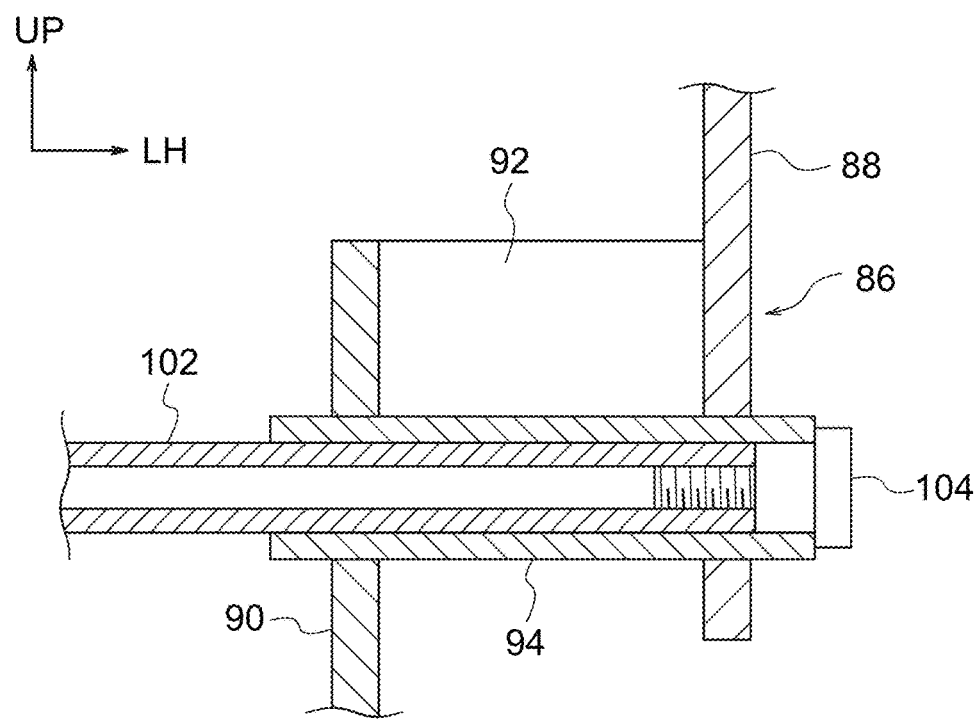
FIG. 14 is a cross-section illustrating a connecting portion between a left side first tilting link and a coupling member.
Figure 15:
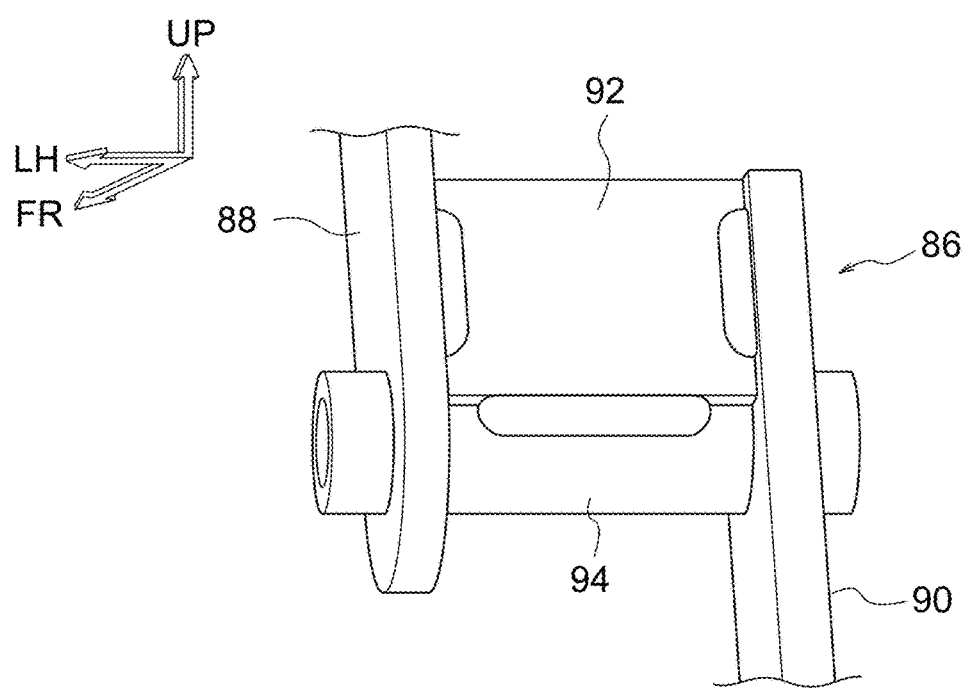
FIG. 15 is a perspective view illustrating configuration peripheral to a coupling portion of a left side first tilting link.

Explanation follows regarding a vehicle seat 10 according to an exemplary embodiment of the present disclosure, with reference to FIG. 1 to FIG. 15. Note that in the drawings, some reference numerals may be omitted in order to facilitate viewing. In each of the drawings, the arrows FR, UP, and LH respectively indicate the front, upper, and left sides of the vehicle seat 10 as appropriate. Unless specifically stated otherwise, simple reference to the front, rear, left, right, up, and down directions refers to these directions with respect to the vehicle seat 10.

As illustrated in FIG. 1 to FIG. 7, the vehicle seat 10 includes a seat body 12, a seat sliding mechanism 36, a reclining mechanism 46, a lifter mechanism 56, left and right armrests 72, and an armrest coordination mechanism 78. The vehicle seat 10 also includes an ECU (controller), not illustrated in the drawings, that controls actuation of the seat sliding mechanism 36, the lifter mechanism 56, and the reclining mechanism 46. Detailed explanation follows regarding each of these configuration elements.

Seat Body

The seat body 12 includes a seat cushion 14 and a seatback 24. The seat cushion 14 includes a cushion frame 16 configuring framework of the seat cushion 14. The seatback 24 includes a back frame 26 configuring framework of the seatback 24. Pads (neither of which are illustrated in the drawings), each of which are covered by a cover, are respectively attached to the cushion frame 16 and the back frame 26.

The cushion frame 16 includes left and right cushion side frames 18 installed at left and right side portions of the seat cushion 14, a front frame 20 that links front portions of the left and right cushion side frames 18 together in a seat left-right direction, and a rear frame 22 that links rear portions of the left and right cushion side frames 18 together in the seat left-right direction. For example, the left and right cushion side frames 18 and the front frame 20 are each configured of sheet metal, and the rear frame 22 is configured of a metal pipe. The rear frame 22 is disposed with its axial direction along the seat left-right direction, and is rotatably attached to the left and right cushion side frames 18. The rear frame 22 corresponds to a "first shaft" of the present disclosure. The rear frame 22 is sometimes referred to below as a first shaft 22.

The back frame 26 includes left and right back side frames 28 installed at left and right side portions of the seatback 24, an upper frame 30 that links upper end portions of the left and right back side frames 28 together in the seat left-right direction, and a back panel 32 that links lower portions of the left and right back side frames 28 together in the seat left-right direction. For example, the left and right back side frames 28, the upper frame 30, and the back panel 32 are each configured of sheet metal.

The back frame 26 projects upward from a rear portion of the cushion frame 16. Specifically, left and right B brackets 34, each configured of sheet metal for example, are fixed to the rear portions of the respective left and right cushion side frames 18 by a method such as bolt fastening. The left and right B brackets 34 extend toward a seat upper side from the rear portions of the left and right cushion side frames 18 and overlap lower portions of the left and right back side frames 28 from the seat left-right direction outsides. The left and right back side frames 28 and the left and right B brackets 34 are fixed together by a method such as bolt fastening. The left and right cushion side frames 18 and the left and right back side frames 28 are thereby fixed together via the left and right B brackets 34. The left and right B brackets 34 configure part of the back frame 26.

Seat Sliding Mechanism 36

The seat sliding mechanism 36 is configured including left and right lower rails 38, and left and right upper rails 40. For example, each of the lower rails 38 and the upper rails 40 are configured by sheet metal and formed in an elongated shape with length along a seat front-rear direction. Each of the lower rails 38 is fixed to a vehicle body floor, not illustrated in the drawings, at a front end portion and a rear end portion via front and rear brackets (not allocated reference numerals). The upper rails 40 are supported so as to be capable of sliding along the seat front-rear direction with respect to the lower rails 38. The seat sliding mechanism 36 allows the left and right upper rails 40 to slide along the seat front-rear direction with respect to the left and right lower rails 38 using driving force from a slide motor 42. Left and right risers 44, each configured of sheet metal for example, are fixed to upper faces of the respective left and right upper rails 40. The left and right risers 44 each correspond to a "support member" of the present disclosure.

Reclining Mechanism 46

The reclining mechanism 46 includes a reclining link 48 and a reclining motor 54. The reclining link 48 is configured by left and right link members 50, and a connecting member 52 that links the left and right link members 50 together in the seat left-right direction. One end side of each of the left and right link members 50 is coupled to a front portion of the corresponding left or right riser 44 so as to be capable of rotating about an axis extending along the seat left-right direction. A sector gear 50A is integrally formed to one out of the left and right link members 50 (the link member 50 on the right side in this case). This sector gear is provided corresponding to the reclining motor 54.

The reclining motor 54 is a motor with a speed reduction gear, and is fixed to one out of the left and right risers 44 (the riser 44 on the right side in this case). A non-illustrated pinion gear is fixed to a non-illustrated output shaft of the reclining motor 54, and the pinion gear meshes with the sector gear 50A. Thus, when the reclining motor 54 rotates, the reclining link 48 rotates with respect to the left and right risers 44.

Lifter Mechanism 56

The lifter mechanism 56 includes a front link 58, a rear link 64, and a lifter motor 70. The front link 58 is provided between the reclining link 48 and a front portion of the cushion frame 16, and is configured by left and right link members 60 and a connecting member 62 that links the left and right link members 60 together in the seat left-right direction. One end portion of each of the left and right link members 60 is coupled to another end portion of the corresponding left or right link member 50 configuring the reclining link 48, so as to be capable of rotating about an axis extending along the seat left-right direction.

Another end portion of each of the left and right link members 60 is coupled to the corresponding left or right cushion side frame 18 so as to be capable of rotating about an axis extending along the seat left-right direction. The front portion of the cushion frame 16 is coupled to the left and right upper rails 40 via the front link 58 and the reclining link 48, and is thereby supported so as to be capable of moving in a seat vertical direction within a predetermined range with respect to the left and right upper rails 40. The front link 58 and the reclining link 48 configure a double link.

The rear link 64 is provided between the rear portion of the cushion frame 16 and the vehicle body floor (between the rear portion of the cushion frame 16 and the left and right upper rails 40 in this case), and includes left and right link members 66. One end portion (a front end portions) of each of the left and right link members 66 is rotatably coupled to rear portion of the corresponding left or right riser 44 via left and right shoulder bolts 68. The left and right shoulder bolts 68 are disposed coaxially to each other, with their axial directions along the seat left-right direction. The left and right shoulder bolts 68 each correspond to a "second shaft" of the present disclosure. The left and right shoulder bolts 68 are sometimes referred to below as "second shafts 68".

Another end portion (a rear end portion) of each of the left and right link members 66 is coupled to the corresponding left or right cushion side frame 18 via the rear frame (first shaft) 22 previously mentioned, and is capable of rotating about the rear frame 22 with respect to the left and right cushion side frames 18. The rear portion of the cushion frame 16 is thereby supported so as to be capable of moving in the seat vertical direction within a predetermined range with respect to the left and right upper rails 40. A sector gear 66A is integrally formed to one out of the left and right link members 66 (the link member 66 on the left side in this case). The sector gear 66A is provided corresponding to the lifter motor 70.

The lifter motor 70 is a motor with a speed reduction gear, and is fixed to the cushion side frame 18 on the left side using nuts and bolts (not allocated reference numerals). A pinion gear (not illustrated in the drawings) is fixed to an output shaft of the lifter motor 70, and the pinion gear meshes with the sector gear 66A previously mentioned. Thus, when the lifter motor 70 rotates, the rear link 64 rotates about the left and right shoulder bolts (second shafts) 68, and the rear portion of the cushion frame 16 is moved in the seat vertical direction. The rear link 64 configures a single link.

ECU

The Electronic Control Unit (ECU) is configured by a microcomputer in which a CPU, ROM, RAM, and an input/output interface (I/O) are connected together via a bus. The I/O of the ECU is electrically connected to the slide motor 42, the reclining motor 54, and the lifter motor 70 previously mentioned. For example, encoders are provided to each of the motors 42, 54, 70 in order to detect a rotation position of the output shaft of each of the motors 42, 54, 70.

An operation section (not illustrated in the drawings) provided to a side face of the seat cushion 14 or the like is electrically connected to the I/O of the ECU. A slide switch, a reclining switch, and a lifter switch are provided to the operation section. The ECU controls actuation of each of the motors 42, 54, 70 in response to operation of the respective switches.

Specifically, when the slide switch is operated, the ECU actuates the slide motor 42, and moves the left and right upper rails 40 in the seat front-rear direction with respect to the left and right lower rails 38. A front-rear position of the seat body 12 with respect to the vehicle body floor is thereby adjusted.

When the lifter switch is operated, the ECU actuates the lifter motor 70 to rotate the rear link 64. The rear link 64 rotates as a drive link of a four-bar linkage mechanism, and the front link 58 rotates as a following link of the four-bar linkage mechanism. An vertical position of the seat body 12 with respect to vehicle body floor is thereby adjusted.

When the reclining switch is operated, the ECU actuates the reclining motor 54 and the lifter motor 70 to rotate the reclining link 48 and the rear link 64. The ECU thereby reclines the seatback 24 as an integral unit with the seat cushion 14 with respect to fixed points at the left and right shoulder bolts (second shafts) 68. Reclining the seatback 24 as an integral unit with the seat cushion 14 in this manner suppresses vertical direction shifting of the position of the back of a seated occupant (shifting of the back of the seated occupant) with respect to the seatback 24, thereby enabling the posture of the seated occupant to be changed in a comfortable way.

Armrests

As illustrated in FIG. 1, FIG. 2, and FIG. 4 to FIG. 8, the left and right armrests 72 are each formed in an elongated, substantially rectangular block shape, and are installed on both left and right sides of the seatback 24. One length direction end portion (a base end portion) of each of the left and right armrests 72 is supported by a left or right armrest shaft 74 that is fixed to the left or right back side frame 28. The left and right armrest shafts 74 are disposed with their axial direction along the seat left-right direction and extend toward the seat left-right direction outsides from the back side frames 28. The left and right armrest shafts 74 are respectively inserted into shaft bearing holes 76 formed in the one length direction end portion of the corresponding left or right armrest 72. The left and right armrests 72 are thereby rotatably coupled to left and right side faces of the seatback 24 via the armrest shafts 74. The left and right armrest shafts 74 each correspond to a "third shaft" of the present disclosure. The armrest shafts 74 are sometimes referred to below as "third shafts 74".

Armrest Coordination Mechanism

As illustrated in FIG. 1 to FIG. 15, the armrest coordination mechanism 78 includes left and right upper links 80, left and right lower links 82, left and right first tilting links 86, and left and right second tilting links 108. The left and right upper links 80 are respectively disposed between the left and right armrests 72 and the seatback 24. For example, the left and right upper links 80 are each configured of sheet metal and have an elongated shape with length along the seat front-rear direction. The left and right upper links 80 each curve in a circular arc shape so as to protrude toward the seat upper side as viewed along the seat left-right direction, and a recess 80A that is recessed toward the seat upper side is formed in a length direction intermediate portion of each of the left and right upper links 80. A circular shaped through-hole 79 is formed in a front end portion of each of the left and right upper links 80, and the left and right armrest shafts (third shafts) 74 are inserted through the respective through-holes 79. The left and right upper links 80 are thereby rotatably coupled to the left and right armrest shafts 74.

A circular column shaped stopper 72A (not illustrated in the drawings except in FIG. 8) extending toward the seat left-right direction inside is formed in the base end portion of each of the left and right armrests 72. The stoppers 72A are fitted into the recesses 80A in the left and right upper links 80. The left and right upper links 80 are thereby restricted from rotating relative to the left and right armrests 72.

The left and right lower links 82 are disposed at the seat left-right direction inside with respect to the left and right rear links 64, and are positioned further toward the seat left-right direction inside than the left and right upper links 80. Namely, in the present exemplary embodiment, the left and right upper links 80 and the left and right lower links 82 are disposed so as to be offset from each other in the seat left-right direction. For example, the left and right lower links 82 are each configured of sheet metal and have an elongated shape with length along the seat front-rear direction. A front end portion of each of the left and right lower links 82 is coupled to the rear frame (first shaft) 22 so as to be capable of rotating about the rear frame 22.

Rear end portions of the left and right lower links 82 are coupled together by a coupling pipe 84. For example, the coupling pipe 84 is configured by metal piping and is disposed with its axial direction along the seat left-right direction. The two axial direction end portions of the coupling pipe 84 are inserted into circular shaped through-holes 83 formed in the rear end portions of the respective left and right lower links 82, such that the left and right lower links 82 are rotatably coupled to the coupling pipe 84. The coupling pipe 84 corresponds to a "fifth shaft" of the present disclosure. The coupling pipe 84 is sometimes referred to below as a "fifth shaft 84".

The left and right first tilting links 86 span between rear end portions of the respective left and right upper links 80 and the rear end portions of the respective left and right lower links 82. The left and right first tilting links 86 respectively include left and right upper portions 88 coupled to the left and right upper links 80, left and right lower portions 90 coupled to the left and right lower links 82, and left and right coupling portions (coupling plates) 92 that link the upper portions 88 and the lower portions 90 together in the seat left-right direction.

For example, the left and right upper portions 88 are each configured of sheet metal and have an elongated shape with length along the seat vertical direction. A lower end portion of each of the left and right upper portions 88 is bent toward the seat front side. For example, the left and right lower portions 90 are each configured of sheet metal and have an elongated shape with length substantially along the seat front-rear direction. For example, the left and right coupling portions 92 are each configured of sheet metal and have a rectangular shape.

The lower end portions of the left and right upper portions 88 are disposed at the seat left-right direction outsides with respect to rear end portions of the left and right lower portions 90, and the left and right coupling portions 92 span between the lower end portions of the left and right upper portions 88 and the rear end portions of the left and right lower portions 90. Each of the coupling portions 92 is fixed to the respective upper portion 88 and the respective lower portion 90 by a method such as welding. Pipe portions 94 (not illustrated in the drawings except in FIG. 11 to FIG. 15), configured by metal piping for example, respectively span between the lower end portions of the left and right upper portions 88 and the rear end portions of the left and right lower portions 90. The respective pipe portions 94 are disposed with their axial direction along the seat left-right direction and are each disposed in a state passing through the lower end portion of the corresponding upper portion 88 and the rear end portion of the corresponding lower portion 90. The pipe portions 94 are fixed to the left and right coupling portions 92 by a method such as welding.

Upper end portions of the left and right upper portions 88 respectively configure upper end portions of the left and right first tilting links 86, and overlap the rear end portions of the left and right upper links 80 from the seat left-right direction inside. A circular shaped through-hole 81 is formed in the rear end portion of each of the left and right upper links 80, and a circular shaped through-hole 89 is formed in the upper end portion of each of the left and right upper portions 88. A hinge pin 96 is inserted into each of the through-holes 81 and the corresponding through-hole 89, and an E ring 98 serving as a detachment prevention member is mounted to each of the hinge pins 96. The upper end portions of the left and right upper portions 88 are thereby rotatably coupled to the rear end portions of the left and right upper links 80 via the left and right hinge pins 96. The left and right hinge pins 96 each correspond to a "fourth shaft" of the present disclosure, and are disposed with their axial direction along the seat left-right direction. The left and right hinge pins 96 are sometimes referred to below as "fourth shafts 96".

Front end portions of the left and right lower portions 90 configure lower end portions of the left and right first tilting links 86, and are disposed at the seat left-right direction outsides of the rear end portions of the left and right lower links 82. A circular shaped through-hole 91 is formed in the front end portion of each of the left and right lower portions 90, and both the axial direction end portions of the coupling pipe (fifth shaft) 84 are inserted through the respective through-holes 91. Left and right collars 100, each formed from resin in a circular tube shape for example, are interposed between hole edges of the respective through-holes 91 and the coupling pipe 84, such that the left and right lower portions 90 are rotatably coupled to the coupling pipe 84. The left and right lower portions 90 are rotatably coupled to the left and right lower links 82 via the coupling pipe 84.

A seat vertical direction intermediate portion of each of the left and right first tilting links 86 is bent so as to protrude toward the seat rear side, and so the left and right first tilting links 86 each have a substantially boomerang shape as viewed along the seat left-right direction. The left and right first tilting links 86 are coupled together by a coupling member 102. The coupling member 102 is configured of metal piping for example, and is disposed with its axial direction along the seat left-right direction. The two axial direction end portions of the coupling member 102 are fitted inside the respective pipe portions 94 of the left and right first tilting links 86. A shoulder bolt 104 is screwed into a female thread formed at the two axial direction end portions of the coupling member 102. The coupling member 102 is thereby prevented from detaching from the respective pipe portions 94.

The left and right first tilting links 86 configure left and right first parallel link mechanisms (first four-bar linkage mechanisms) 106 together with part of the seat body 12, the left and right upper links 80, and the left and right lower links 82.

The left and right second tilting links 108 are disposed at the seat rear side and seat left-right direction inside of the left and right link members 66 of the rear link 64. The left and right second tilting links 108 are each configured of sheet metal for example, and have an elongated shape with length substantially along the seat front-rear direction. A rear portion of each of the left and right second tilting links 108 is bent toward the seat upper side.

One end portion (a front end portion) of each of the left and right second tilting links 108 is disposed at the seat rear side of the one end portion (front end portion) of the corresponding left or right link member 66, and is rotatably coupled to the rear portion of the left or right riser 44 via a left or a right shoulder bolt 110. The left and right shoulder bolts 110 are coaxially disposed with their axial direction along the seat left-right direction. The left and right shoulder bolts 110 each correspond to a "sixth shaft" of the present disclosure. The left and right shoulder bolts 110 are hereafter referred to as "sixth shafts 110".

Another end portion (rear end portion) of each of the left and right second tilting links 108 is disposed between the rear end portion of the corresponding left or right lower link 82 and the lower end portion of the corresponding left or right first tilting link 86. A circular shaped through-hole 109 is formed in a rear end portion of each of the left and right second tilting links 108, and the two axial direction end portions of the coupling pipe (fifth shaft) 84 are inserted through the respective through-holes 109. The left and right collars 100 previously mentioned are interposed between hole edges of the respective through-holes 109 and the coupling pipe 84, such that the left and right second tilting links 108 are rotatably coupled to the coupling pipe 84. The left and right second tilting links 108 are rotatably coupled to the left and right lower links 82 and the left and right first tilting links 86 via the coupling pipe 84. Note that a circular tube shaped resin spacer 112, for example, is disposed between the rear end portion of each of the left and right second tilting links 108 and the lower end portion of the corresponding left or right first tilting link 86.

The left and right second tilting links 108 configure left and right second parallel link mechanisms (second four-bar linkage mechanisms) 114 together with the left and right rear links 64, the left and right lower links 82, and the left and right risers 44.

In the vehicle seat 10 with the above configuration, the stoppers 72A (see FIG. 8) of the left and right armrests 72 are respectively fitted into (engaged with) the recesses 80A of the left and right upper links 80 from the lower side, such that the left and right armrests 72 are retained in a horizontal or a substantially horizontal orientation. However, the left and right armrests 72 are permitted to rotate in one direction (to rotate clockwise as viewed from the seat left side) about the axis of the left and right armrest shafts 74 with respect to the left and right upper links 80, such that the left and right armrests 72 are capable of being flipped upward to a state in which the length direction of the left or right armrest 72 runs along the vertical direction of the seatback 24.

Operation and Advantageous Effects

Explanation follows regarding operation and advantageous effects of the present exemplary embodiment.

In the vehicle seat 10 with the above configuration, the seat body 12 includes the seat cushion 14 and the seatback 24. The lifter mechanism 56 is configured including the rear link 64 that is rotatably coupled to a rear portion of the seat cushion 14 via the first shaft 22, and that is rotatably coupled to the risers 44 via the second shafts 68, and the vertical position of the seat body 12 with respect to the vehicle body is thereby adjustable. The reclining mechanism 46 reclines the seatback 24 as an integral unit with the seat cushion 14, with respect to fixed points at the second shafts 68. The armrests 72 are rotatably coupled to the side faces of the seatback 24 via the third shafts 74.

Note that the vehicle seat 10 includes the upper links 80 that have front end portions rotatably coupled to the third shafts 74 and that are restricted from rotating relative to the armrests 72, and the lower links 82 that have front end portions rotatably coupled to the first shaft 22. The vehicle seat 10 also includes the first tilting links 86 that have upper end portions rotatably coupled to the rear end portions of the upper links 80 via the fourth shafts 96 and lower end portions rotatably coupled to the rear end portions of the lower links 82 via the fifth shaft 84, and the second tilting links 108 that have upper end portions rotatably coupled to the fifth shaft 84 and lower end portions rotatably coupled to the risers 44 via the sixth shafts 110. The first tilting links 86 configure the first parallel link mechanisms 106 together with part of the seat body 12, the upper links 80, and the lower links 82. The second tilting links 108 configure the second parallel link mechanisms 114 together with the rear links 64, the lower links 82, and the risers 44.

In the vehicle seat 10 configured as described above, in order to adjust the vertical position of the seat body 12 (the seat cushion 14 and the seatback 24) with respect to the vehicle body, the second parallel link mechanisms 114 are actuated such that the first parallel link mechanisms 106 move up or down together with the seat body 12 with respect to the vehicle body. In order to recline the seatback 24 as an integral unit with the seat cushion 14, the first parallel link mechanisms 106 and the second parallel link mechanisms 114 are actuated such that the upper links 80 maintain a predetermined orientation. The upper links 80 are restricted from rotating relative to the armrests 72, and so the armrests 72 are also maintained in a predetermined (horizontal or substantially horizontal) orientation.

In this manner, in the present exemplary embodiment the armrests 72 can be maintained in a predetermined orientation irrespective of reclining in a configuration in which the vertical positions of the seat cushion 14 and the seatback 24 are adjustable with respect to the vehicle body, and the seatback 24 reclines as an integral unit with the seat cushion 14.

Moreover, in the present exemplary embodiment, the upper links 80 positioned on the armrest 72 side and the lower links 82 positioned on the lifter mechanism 56 (rear link 64) side are disposed offset from each other in the seat left-right direction. Moreover, the first tilting links 86 include the upper portions 88 coupled to the upper links 80, the lower portions 90 coupled to the lower links 82, and the coupling portions 92 that link the upper portions 88 and the lower portions 90 together in the seat left-right direction. This makes it easier for the first tilting links 86 to span between the upper links 80 and the lower links 82 that are positioned offset from each other in the seat left-right direction.

Furthermore, in the present exemplary embodiment the first tilting links 86 that couple together the upper links 80 positioned on the armrest 72 side and the lower links 82 positioned on the lifter mechanism 56 (rear link 64) side are each bent at a seat vertical direction intermediate portion so as to protrude toward the seat rear side. For example, this enables the first tilting links 86 to be disposed at the seat rear side of any components provided to side portions of the seatback 24, thereby enabling the overall configuration of the vehicle seat 10 to be made smaller in the seat left-right direction than in cases in which the first tilting links 86 are disposed at the seat left-right direction outsides of such components.

Moreover, in the present exemplary embodiment the armrests 72, the rear links 64, the upper links 80, the lower links 82, the first tilting links 86, and the second tilting links 108 are provided on both left-right direction sides of the seat body 12. The first parallel link mechanisms 106 and the second parallel link mechanisms 114 are thereby provided on both left-right direction sides of the seat body 12. The left and right rear links 64 are coupled together by the first shaft 22, the left and right first tilting links 86 are coupled together by the coupling member 102, and the left and right lower links 82 and the left and right second tilting links 108 are coupled together by the coupling pipe 84. This enables the left and right first parallel link mechanisms 106, the left and right second parallel link mechanisms 114, and the left and right armrests 72 to be coordinated with each other.

Note that although the armrests 72, the rear links 64, the upper links 80, the lower links 82, the first tilting links 86, and the second tilting links 108 are provided on both left-right direction sides of the seat body 12 in the above exemplary embodiment, there is no limitation thereto. Configuration may be such that the above members are only provided on one left-right direction side of the seat body 12.

Although the seat vertical direction intermediate portion of each of the first tilting links 86 is bent so as to protrude toward the seat rear side in the above exemplary embodiment, there is no limitation thereto. The first tilting links 86 may each be formed in a linear shape as viewed along the seat left-right direction.

Although each of the first tilting links 86 includes the upper portion 88 coupled to the upper link 80, the lower portion 90 coupled to the lower link 82, and the coupling portion 92 that links the upper portion 88 and the lower portion 90 together in the seat left-right direction in the above exemplary embodiment, there is no limitation thereto. Namely, in cases in which the placement offset (displacement amount) between the upper links 80 and the lower links 82 in the seat left-right direction is small, the first tilting links 86 may each be formed in a simple elongated flat plate shape.

Various other modifications may be implemented within a range not departing from the spirit of the present disclosure. Obviously the scope of rights of the present disclosure is not limited by the above exemplary embodiment.

What is claimed is:

1. A vehicle seat comprising:
   a seat body including a seat cushion and a seatback;
   a lifter mechanism that is configured including a rear link rotatably coupled to a rear portion of the seat cushion via a first shaft and rotatably coupled to a support member on a vehicle body side via a second shaft, and that is capable of adjusting a vertical position of the seat body with respect to a vehicle body;
   a reclining mechanism that reclines the seatback, as an integral unit with the seat cushion, with respect to a fixed point at the second shaft;
   an armrest that is rotatably coupled to a side face of the seatback via a third shaft;
   an upper link that has a front end side rotatably coupled to the third shaft, and that is restricted from rotating relative to the armrest;
   a lower link that has a front end side rotatably coupled to the first shaft;
   a first tilting link that has an upper end side rotatably coupled to a rear end side of the upper link via a fourth shaft, that has a lower end side rotatably coupled to a rear end side of the lower link via a fifth shaft, and that configures a first parallel link mechanism together with a part of the seat body, the upper link, and the lower link; and
   a second tilting link that has an upper end side rotatably coupled to the fifth shaft, that has a lower end side rotatably coupled to the support member via a sixth shaft, and that configures a second parallel link mechanism together with the rear link, the lower link, and the support member.

2. The vehicle seat of claim 1, wherein:
   the upper link and the lower link are disposed offset from each other in a seat left-right direction; and
   the first tilting link includes:
   an upper portion coupled to the upper link,
   a lower portion coupled to the lower link, and
   a coupling portion linking the upper portion and the lower portion together in the seat left-right direction.

3. The vehicle seat of claim 1, wherein a seat vertical direction intermediate portion of the first tilting link is bent so as to protrude toward a seat rear side.

4. The vehicle seat of claim 1, wherein:
   the armrest, the rear link, the upper link, the lower link, the first tilting link, and the second tilting link are respectively provided on both left-right direction sides of the seat body; and
   the left and right rear links are coupled together by the first shaft, the left and right first tilting links are coupled together by a coupling member, and the left and right lower links and the left and right second tilting links are coupled together by the fifth shaft.

5. The vehicle seat of claim 1, wherein the armrest is capable of being flipped upward with respect to the upper link to a state in which a length direction of the armrest runs along a vertical direction of the seatback.

6. The vehicle seat of claim 2, wherein the lower link is positioned further toward the seat left-right direction inside than the upper link.

7. The vehicle seat of claim 4, wherein the fifth shaft is a coupling pipe with an axial direction along a seat left-right direction.

* * * * *